(12) United States Patent
Yoshimura et al.

(10) Patent No.: US 6,477,133 B1
(45) Date of Patent: Nov. 5, 2002

(54) DISK DRIVE WITH UNBALANCE CORRECTING MECHANISM

(75) Inventors: Yasuhiro Yoshimura, Chiyoda (JP); Yoshishige Endo, Tsuchiura (JP); Katsutoshi Nii, Hitachi (JP); Yoshihiro Satou, Chiyoda (JP); Yoshiaki Yamauchi, Minori (JP); Noriyuki Kumasaka, Oume (JP); Kazuto Oyama, Hitachinaka (JP); Hisahiro Miki, Chigasaki (JP); Tomoki Hirata, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 148 days.

(21) Appl. No.: 09/644,854

(22) Filed: Aug. 24, 2000

(30) Foreign Application Priority Data

Feb. 2, 2000 (JP) .......................... 2000-030204

(51) Int. Cl.[7] .......................... G11B 23/00; G11B 25/00
(52) U.S. Cl. ...................................... 369/263
(58) Field of Search .................. 369/263, 264, 369/258; 360/98.07, 68.08, 99.04, 99.08, 99.12, 97.02

(56) References Cited

U.S. PATENT DOCUMENTS 6,333,912 B1 * 12/2001 Sohn .......................... 369/263

2001/0010435 A1 * 8/2001 Kikuchi et al. ............ 310/67 R
2001/0038601 A1 * 11/2001 Kikuchi et al. ............. 369/263

OTHER PUBLICATIONS

Japanese Patent No. 2824250.
Japanese Patent Unexamined Publication No. 11-154371.
Japanese Patent Unexamined Publication No. 10-92094.
Japanese Patent Unexamined Publication No. 11-156243.

* cited by examiner

Primary Examiner—Hoa T. Nguyen
Assistant Examiner—Julie Anne Watko
(74) Attorney, Agent, or Firm—Antonelli, Terry, Stout & Kraus, LLP

(57) ABSTRACT

A disk drive is realized, which omits running-in for stabilizing a change in a correcting function produced by sliding between balls and a rolling groove in an unbalance correcting mechanism, and prevents immobility and straying of balls, and which comprises a unit mechanism assembled by using 12 balls subjected to surface treatment with heptadecafluorodecyltrimethoxysilane and a turntable plated with a chemical nickel plating containing phosphorus and boron to have a thickness of 5 μm and by injecting 1 microliter of ester oil into the rolling groove, and further comprises a recess formed in a sidewall of the rolling groove of the unbalance correcting mechanism to prolong the service life of the correcting function.

7 Claims, 5 Drawing Sheets

COMPARISON OF FRICTIONAL RESISTANCE

DISK DRIVE WITH UNBALANCE CORRECTING MECHANISM

BACKGROUND OF THE INVENTION

The invention relates to an unbalance correcting mechanism having rollable balls and a rolling groove to correct unbalance generating in a rotating device, and more specifically to a disk drive, such as CD-ROM and DVD-ROM drives, which reproduce information, or DVD-RAM, MO and removable HD drives, which write and read information, for rotating a disk-shaped, removable recording medium at high speed.

Japanese Patent Gazette No. 2,824,250 describes a balancer for correcting unbalance of a disk drive. The balancer comprises a hollow annular portion formed integral with a rotor and balancing members (spherical bodies) movable in the hollow annular portion. Japanese Patent Unexamined Publication No. H10-92094 describes a disk type storage device comprising at least one balance correcting weight freely movable on a path having a center of rotation, which coincides with that of a disk to automatically correct unbalance of the disk.

Japanese Patent Unexamined Publication No. H11-154371 describes a disk drive comprising a ring groove provided on a turntable with its center coinciding with a center of rotation and dynamic balance correcting balls movably received in the ring groove, thereby enabling substantially reducing vibrations and noises, and describes measures, such as application of a lubricant, for example, graphite, molybdenum disulfide, fluororesin and silicone oil, on a wall surface of the ring groove, or injection of a liquid into the ring groove, and formation of a hard layer of chromium plating inside the ring groove, for the purpose of dampening vibrations of the balance correcting balls.

Also, Japanese Patent Unexamined Publication No. H11-156243 describes a centrifugal separator for specimens, provided with a ball balancer, which is capable of suppressing noises caused by unbalance of a turntable and vibrations of the turntable and test tubes, and describes that surfaces of balls are covered with rubber or synthetic resin and surfaces of the ball balancer are applied with a coating agent, such as ethylene glycol, that has a high self-lubricating quality.

The above-described Patent No. 2,824,250 and Japanese Patent Unexamined Publication No. H10-92094 describe the structure, working principle and operation of the unbalance correcting mechanism. Basically, a balance member or a correcting member is moved in a hollow annular portion or in a rolling groove by a centrifugal force generated by unbalanced forces, whereby unbalance is corrected. In the above-mentioned prior art, balls are essentially used as the balance member or correcting member, and therefore an explanation will be given below collectively with respect to balls assuming that the a hollow annular portion or a rolling groove serves as a rolling groove.

In such an unbalance correcting mechanism, there is a fear that the balls and the rolling groove slidingly contact with each other as a disk drive is driven, and so fitting of contact portions proceeds to cause a change in correcting function. In order that a lubricating oil injected into a rolling groove at the time of assembly be diffused evenly over the entire rolling groove and correcting member, a preliminary operation of the correcting member in advance is necessary. In approximately 200 hours of preliminary operation, fitting of contact portions and diffusion of a lubricant are completed with the result that a stable unbalance correcting function can be obtained. Therefore, prior to shipment of a disk drive, running-in operation must be performed to complete the above fitting.

Time required for the running-in operation is a cause for an increase in cost, and so it is essential to shorten such time as much as possible.

Also, during running-in operation of a disk drive and operation of the disk drive after the running-in operation surfaces of balls and a rolling groove are scraped off to produce wear particles. These particles may get filled between the balls and the rolling groove to obstruct smooth movements of the correcting member and further make the balls immovable, which adversely affects reliability of the disk drive. It is thus essential to eliminate immovability the balls.

Further, a lubricating oil is injected into the rolling groove not only to reduce wear of the balls and the rolling groove but also to adjust the sliding quality of the balls. When an amount of the lubricating oil is too much, however, restraining forces on the balls and the rolling groove may become excessively great to cause immobility of the balls. conversely, when an amount of the lubricating oil is too little, restraining forces on the balls and the rolling groove may become excessively small to cause the balls to stray, so that the balls fail to stop relative to the rolling groove at the unbalance correcting position. It is a subject to prevent immobility and straying of the balls.

When a lubricant is injected as described in Japanese Patent Unexamined Publication No. H11-154371, it will take time for the injected lubricant to uniformly wet the balls and the ring groove, and so a preliminary operation is necessary. Also, the lubricant is easy to wet the balls, and the lubricant offers resistance to make it hard for the balls to roll. It is difficult to adjust friction between the balls. and the ring groove to a level not too large or too small. So, such adjustment imposes a problem. Also, it is another problem to adjust the hardness of the hard film formed in the ring groove to an optimum level.

Control of film thickness of rubber or synthetic resin described in Japanese Patent Unexamined Publication No. H11-156243 also imposes a problem in a high-density storage apparatus such as disk drives. Also, rubber having a thickness on the order of micron is liable to generate contamination due to wear. When ethylene glycol is added, it is problematic to optimize an amount added.

OBJECT AND SUMMARY OF THE INVENTION

An object of the present invention is to provide a disk drive, which solves the above problems and which can reduce time for running-in operation to lower cost and prevent immobility and straying of balls.

The disk drive according to of the invention has the following structural features to solve the above-mentioned problems.

That is, the disk drive has an annular groove centered on an axis of rotation of a spindle motor, and a plurality of rollable correcting bodies provided in the annular groove, surfaces of the correcting members having surface tension of 30 dyne/cm or less and a contact angle of 80–150 degrees with respect to water. Thus surfaces of the correcting members are treated with polymer of fluoroalkylsilane or fluoroalkylsilane or with a layer of fluororesin.

Also, a lubricating oil, of which main component is ester oil, is injected into the annular groove.

Further, the annular groove is formed on a surface thereof with a hard film layer, which has a Vickers hardness of 600 or higher. In addition, the hard film layer is a plating layer containing nickel as its main component, phosphorus and boron.

Further, in order that upon application of centrifugal forces due to rotation of the spindle motor, a lubricating oil in the annular groove will not reach areas where the correcting members come into contact with the sidewall of the annular groove, a recess or a projection is provided between the bottom surface of the annular groove and that point on a sidewall of the annular groove, with which the correcting members are brought into contact.

DESCRIPTION OF THE EMBODIMENTS

Embodiments of the present invention will be described in detail with reference to the accompanying drawings.

Figure 1:
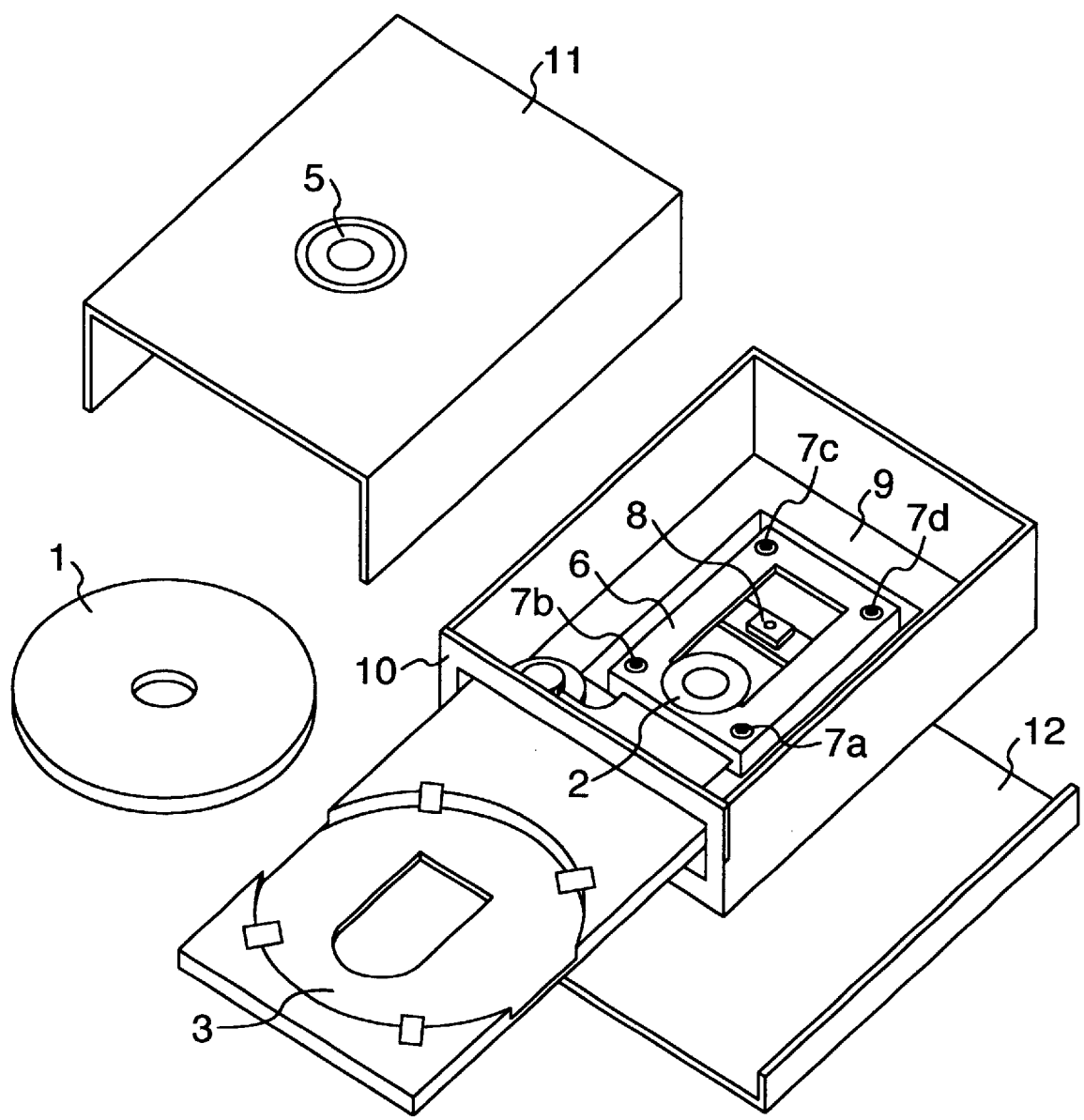
FIG. 1 is an external view showing an optical disk drive according to an embodiment of the present invention.

FIG. 1 is a view showing an external appearance of an optical disk (CD-ROM) drive according to an embodiment of the invention. The operation of the optical disk drive is as follows. To load a disk 1, which is a disk-shaped recording medium, into the drive (or unload it from the drive), a disk loading mechanism (not shown) causes a disk tray 3, on which the disk 1 is placed, to project from a load/unload opening formed in a front panel 10 of the drive. In this state, the disk 1 is placed on the projected disk tray 3. Then, the loading mechanism has the disk tray 3 feeding the disk 1 into the drive. The disk 1 is fixed through magnetic attraction by a disk damper (not shown), which is mounted on a clamper holder 5 on a turntable 2 of a spindle motor.

Provided on a unit mechanism chassis 6, which serves as a holding member, are a rotation drive mechanism, such as spindle motor, and an optical head.

The disk 1 is rotated by the spindle motor to be increased in speed to a specified revolution speed. When the specified revolution speed is reached, the optical head (not shown) on the unit mechanism chassis 6 disposed below the disk 1 writes information onto or reads it from the disk 1. The optical head is loaded on an objective drive and a radial moving means is provided to be movable in a radial direction of the disk 1. The unit mechanism chassis 6 is mounted, through vibration proof legs 7a, 7b, 7c, 7d of elastic member, to a unit holder 9, which is secured to a mechanism base that constitutes a case (not shown).

Disks 1 used in CD-ROM and DVD drives are feature in that they are exchangeable media. Disks 1 therefore are manufactured by pressing in mass production and so they cannot be made so high in manufacturing precision such that they are greatly dispersed in thickness and concentricity between a clamp inner diameter and a disk outer diameter. Further, a weight unbalance cannot be neglected which is caused by letters and patterns printed on the disk 1 or a label applied by a user for disk identification. More specifically, some disks 1 themselves are unbalanced in weight to involve about 1 gcm at maximum. When such disk 1 is rotated at high speed, a spindle motor that supports the disk 1 is applied by an unbalanced load, which is exceedingly increased with rotation. A first-order component of the rotating vibrations of the disk 1 caused by the unbalanced load is transmitted to the unit mechanism chassis 6 through the spindle motor, such vibrations resulting in vibrations of the drive itself or noises due to contact, interference and so on among respective parts. To correct unbalance of the disk 1, an unbalance correcting mechanism is used and constructed such that an annular groove is formed in a rotating portion (in this embodiment, a turntable 2) rotating with the disk and correcting bodies (generally spherical bodies are used) are inserted into the annular groove to move, upon rotation, in a direction, in which unbalance decreases.

Detailed explanations will be given below to a method of manufacturing balls, which are the correcting bodies (spherical bodies) used in such a disk unbalance correcting mechanism, and a rolling groove.

First, an explanation will be given to a method of surface treatment of balls. Balls made of non-magnetic SUS303 or 304 are first immersed in acetone and washed for about two minutes in an ultrasonic cleaning equipment. Such cleaning is intended for removing organic components adhering to surfaces of the balls. Hence, organic solvents other than acetone or degreasing agents containing surfactant may be used. The cleaning time depends on the degree of contamination and is not limited to the time described above. After cleaning, the balls are dried and then immersed for one minute in a hydrochloric acid of 1 normal having been heated to 45–55° C., for pretreatment. With such pretreatment, inorganic contaminants are removed from the ball surfaces and at the same time fine irregularities are formed on the ball surface due to the corrosion effect of hydrochloric acid. Corrosion begins at grain boundaries of the ball material, and the degree of corrosion is increased by extending the time of immersion or raising the temperature or density of hydrochloric acid, which results in corrosion at portions other than the grain boundaries.

Observation of the ball surfaces with the use of an optical microscope has revealed that when temperature of hydrochloric acid of 1 normal was set to range between 45° C. and 55° C., an optimum time for immersion was about 30 seconds to about 2 minutes. When the immersion time was shorter than about 30 seconds, corrosion was not adequate on the ball surfaces. When the immersion time was longer than two minutes, the ball surfaces were heavily subjected to corrosion to such an extent that they lost metallic gloss, and so they became coarse and corroded portions would fall off when the balls are moving in the rolling groove, which is not preferable. Heightwise differences in surface irregularities formed by corrosion were on the order of several μm to 50 μm in terms of average value. Apparently, the optimum immersion time varies depending on the temperature or density of hydrochloric acid. Also, provided that the above-mentioned object is achieved, the pretreatment liquid is not specifically limitative, and other acids such as sulfuric acid and nitric acid or alkaline water solution such as potassium hydroxide and sodium hydroxide may be used instead of hydrochloric acid.

After the pretreatment, the balls were immersed in an ion-exchange water and treated by the ultrasonic cleaning equipment for two minutes. Such cleaning was repeated three times to thoroughly wash away hydrochloric acid. Such cleaning method is not specifically limitative but may be running water cleaning provided that hydrochloric acid can be washed thoroughly. After cleaning with water, the balls dried were immersed in a surface-treatment liquid for 30 minutes, drawn up from the surface-treatment liquid and dried, and the balls were then heated in a furnace set at 150° C. for 30 minutes. It has been confirmed that the treatment was effective provided that the heating temperature was in the range of about 110–250° C. and the heating time was in the range of about 5–60 minutes. The reason why the heating time was set to 60 minutes or less is that a heating time too long leads to an increased operation cost but not that the effect of treatment degrades. The surface-treatment liquid was made by mixing 1 wt % of heptadecafluorodecyltrimethoxy-silane $CF_3(CF_2)_7CH_2CH_2Si(OCH_3)_3$ (alias fluoroalkyl-silane), which is a water- and oil-repellent, in a solvent of octadecafluorooctane $C_8F_{18}$ (alias perfluorocarbon) and adding to the intermediate product a trace amount of aminosilane as a catalyst for hydrolytic reaction.

After the surface treatment, the balls were immersed in the solvent for 30 seconds to remove an excess amount of fluorodecyltrimethoxysilane coated on the ball surfaces. Preferably, a concentration of the surface treatment liquid was between 0.5 wt % and 10 wt %, and when the concentration was at most 0.5 wt %, the coating density on the ball surfaces was not adequate, surface treatment was less effective. On the other hand, when the concentration was at least 10 wt %, an excess amount of the surface treatment liquid adhering to the ball surfaces increased after the treatment, so that consumption of fluorodecyltrimethoxysilane increased, which is not preferred in cost. Since the solvent of perfluorocarbon used for the surface treatment liquid was small in water content and hydrolysis proceeded slowly at room temperature, it was used to prolong a pot life. However, the solvent is not limited to perfluorocarbon but may be other solvents such as isopropyl alcohol, ethyl alcohol and methyl alcohol.

In the above embodiment, cost for treatment can be suppressed because balls are not treated one by one but a large number of balls can be treated at a time by the use of a mesh-like container such as a sieve.

Methods of ball surface treatment also include one, in which fluororesin is coated instead of fluoroalkylsilane. This method is the same as that described above with respect to the step of pretreatment of balls, and includes a surface treatment step, in which balls are immersed in a liquid fluororesin composed of reformed tetrafluoroethylene, and then heated and dried. Some methods comprise immersing balls into a coating agent containing fluororesin particles.

The above-described surface treatment was implemented to make surface tension of a ball 30 dyne/cm or less. In this manner, with the surface tension of 30 dyne/cm or less, it is possible to perform control so that too much lubricating oil (viscous material) injected into the rolling groove does not adhere excessively to the correcting members, thus preventing the correcting members from rendering stationary.

In the case where fluoroalkylsilane is used, the surface treatment film thus formed is composed of a surface layer of a thickness formed by a single molecule to several tens of molecules, i.e., a solid or semisolid layer or a mixed layer thereof having a thickness of several nm to several tens of nm. Heating in the surface treatment step is performed to cause hydrolysis and dehydration polymerization reactions in fluoroalkylsilane to make it solidify. In some cases, insufficient solidification results in accordance with the degree of heating. In that case, a semisolid film is partly mixed in the surface-treated layer. When polymer of fluoroalkylsilane is used, the surface treatment film thus formed will be several molecules to several thousand molecules thick, that is several tens of nm to several tm thick. In other aspects, the state of surface is similar to that with fluoroalkylsilane. When an agent of fluororesin is formed, the state of surface presents a solid layer, of which thickness can be selected from a wide range from several tens of nm to several hundred μm by adjusting the concentration of the treatment liquid. Since it is preferable that an upper limit of the film thickness is such that recesses of the surface irregularities are not filled up and the effect thereof is not canceled, the film thickness is preferable to be between several nm and several μm.

Figure 2A:
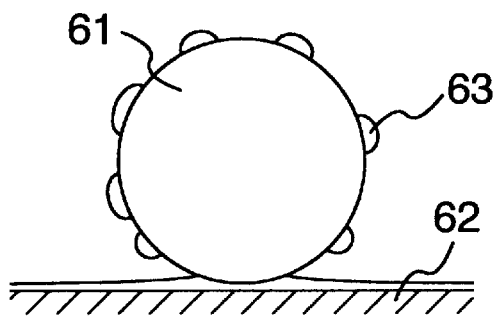
FIG. 2A is a view showing a state of a lubricating oil when balls are not subjected to surface treatment.
Figure 2B:
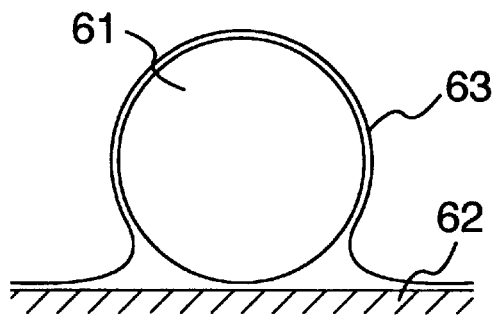
FIG. 2B is a view showing a state of the lubricating oil when the balls are subjected to surface treatment.

FIG. 2A shows a state of a lubricating oil (ester oil) with surface treatment, and FIG. 2B shows a state of the oil without surface treatment.

Methods for examining the surface characteristics of a ball after surface treatment include one, in which water is made to drip onto the ball. Since the surface of the surface-treated ball is reduced in wettability, water dripped onto the ball is repelled and so is left little thereon. It has been confirmed that when in the case where sufficiently fine small water droplets relative to the curved plane of the ball surface, for example, 0.1 mm$^3$ of water, are dripped onto the ball surface, the above-mentioned surface treatment has been favorably effected in the case of water contact angle being 80–150°.

In accordance with the coating with fluoroalkylsilane or fluoroalkylsilane polymer or with fluororesin, the water contact angle varies, and when the water contact angle is 80 degrees or less, the coating is not adequate. When surface treatment is effected with the use of fluoroalkylsilane or fluoroalkylsilane polymer or fluororesin, the water contact angle is normally 120 degrees or less with a substantially smooth surface. In the case of the water contact angle being 120 degrees or more, irregularities of the surface formed during by the cleaning step produces a shape effect. When the water contact angle is 150 degrees or more, irregularities of the surface are too fine. That is, corrosion of the ball surface during the cleaning step has progressed too much, which is not preferable. In the case where the balls having been subjected to surface treatment with fluoroalkylsilane or fluoroalkylsilane polymer or with fluororesin are brought into contact with ester oil that is to be injected as a lubricant into the rolling groove, low surface tension of the ball 61 as shown in FIG. 2A causes the ester oil 63 to adhere suitably to the ball 61 without spreading over the entire surface of the ball 61. When to much of the ester oil 63 adheres to the surface of the ball 61 as shown in FIG. 2B, the oil offers resistance against movements of the ball 61 and adherence of the ball 61 to the groove 62 or adherence of the ball 61 to adjacent balls (not shown) becomes excessive to be responsible for immovability of the balls. When the ester oil does not adhere to the balls, friction between the balls decreases to be responsible for straying of the balls. As described above, the surface treatment of the ball serves to adjust adhesion of the ester oil to the ball surface, resulting in provision of a moderate coefficient of dynamic friction and/or coefficient of static friction.

When treatment with fluorine is not implemented on the balls, the ester oil wets and spreads over the surfaces of the balls to adhere thereto excessively, so that adhesion between the balls becomes great or movements of the balls are impeded, which is not preferable.

Figure 3A:
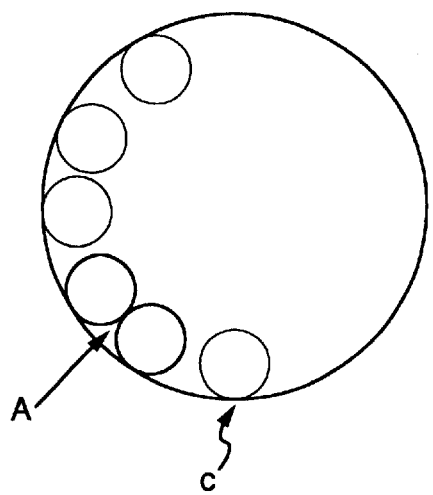
FIG. 3A is a view showing an exemplary arrangement of balls of a ball balancer and FIG. 3B is a view, as viewed from an A-side of FIG. 3A, showing an action of friction.
Figure 3B:
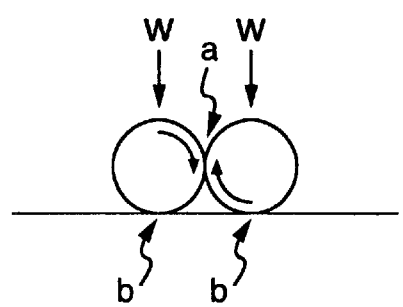

Hereupon, a friction mechanism of the ball balancer will be explained with reference to FIGS. 3A, 3B and 4. Areas where balls undergo friction include a friction portion a, a friction portion b and a friction portion c, as shown in FIG. 3A. Sliding friction occurs on the friction portion a, and rolling friction and sliding friction mixedly occur on the friction portions b and c. Of the above-mentioned friction portions, the friction portion b is directly related to a load W of the ball and, , a centrifugal force prevails at the friction portion c. Accordingly, at low speed rotation, the friction force at the friction portion c is small as compared with those at the friction portions a and b. With the ball balancer, correction of unbalance cannot be frequently achieved unless a lubricating material is applied on the ball rolling surface, because the friction force is small and so the balls do not stop at predetermined positions but continue straying even when a predetermined revolution speed is reached after the motor is driven. Therefore, with conventional ball balancers, prevention of such straying is attempted by applying a lubricating oil to the rolling surface and imparting a frictional resistance to the balls through surface treatment. With the conventional ball balancers, however, it is difficult to provide for an appropriate frictional resistance because the frictional resistance is related to viscosity versus temperature relationship of the lubricating oil and to precision (sphericity) of balls after surface treatment.

Figure 4:
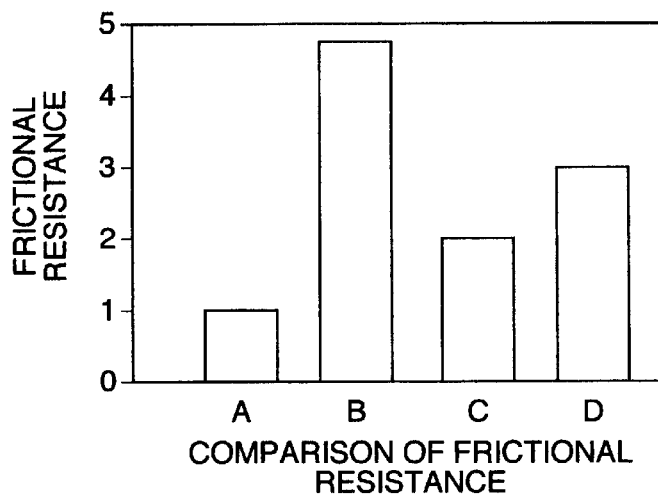
FIG. 4 is a graph showing effects of the ball surface treatment and of application of a lubricating oil.

More specifically, experimental results shown in FIG. 4 have revealed that (A) assuming that frictional resistance is taken as 1 when balls are not subjected to surface treatment and any lubricating oil is not used, the frictional resistance is made four times by (B) simply applying the lubricating oil to the rolling surface. The frictional resistance depends greatly on temperature and increases appreciably as temperature lowers. Comparing two cases, in one (C) of which balls are subjected to surface treatment according to the invention but any lubricating oil is not used and in the other (A) of which balls are not subjected to surface treatment and any lubricating oil is not applied to the rolling surface, frictional resistance is increased about two times. In the case (B), in which conventional balls are not subjected to surface treatment and a lubricating oil is applied to the rolling surface, the frictional resistance is increased by about five times, whereby there is caused a problem that the balls are made immovable. In a case (D), in which the balls are subjected to surface treatment and a lubricating oil is applied to the rolling surface, the frictional resistance is increased only by about three times, which is somewhat small.

That is, frictional resistance is small and constant because surface treatment in the invention provides a small film thickness of several nm to several tens of nm and a coating film is given a frictional resistance without any change in surface precision (sphericity) of balls. Further, because the surface treatment in the invention comprises fluorine coating that has a lubricating oil-repellent property, the friction portion a shown in FIG. 3B is with little lubricating oil and so is not affected by viscous resistance of the lubricating oil. Accordingly, with the embodiment of the invention, when the lubricating oil is applied to the rolling surface, the frictional resistance increases less to amount to at most about three times that encountered when balls are not subjected to surface treatment and any lubricating oil is not applied to the rolling surface. In the invention, to reduce influence of temperature on viscous frictional resistance when the lubricating oil is applied, polyol ester oil likely to have less outage due to evaporation than that with conventional mineral-based lubricating oil is used as a lubricating oil and has a viscosity of 20–40 centipoise. Results of equipped motor evaluation in the case of being mounted on a motor have revealed that a combination of this range of viscosity with the fluorine coating almost eliminated straying of balls and enabled precise correction of unbalance. At higher viscosities, temperature makes a great influence while at lower viscosities the frictional resistance becomes small at high temperatures (about 60° C.) and there is involved the possibility that the frictional resistance decreases due to evaporation of the lubricating oil over a long period of use.

Also, an oil film of an appropriate thickness formed on the balls and in the groove by injection of ester oil is effective in alleviating direct contact between the balls and the groove and between the balls to extend life of a film of fluoroalkylsilane or fluororesin applied to the surfaces of the balls and preventing wear of the balls and the groove.

Further, examination of dynamic stability of balls and a rolling groove in the case of changing the number of balls received in the rolling groove has revealed that a standard deviation of coefficients of dynamic friction measured with the number of balls varied from 8 to 16 becomes substantially zero when 1 $\mu l$ of ester oil is injected into the rolling groove, demonstrating a high stability. A standard deviation with no ester oil being injected was 0.0045.

Figure 5:
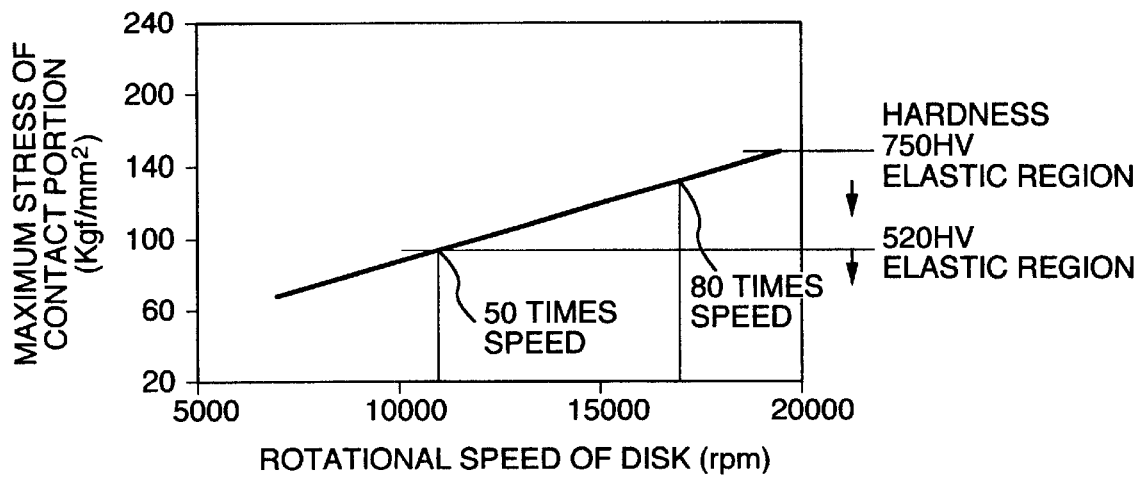
FIG. 5 is a graph showing the hardness required of a rolling groove.

Next, a method of providing hard plating on a turntable will be described. What needs hard plating is the rolling groove that contacts the balls. To simplify the processing step, the entire turntable was subjected to plating. As hard plating, KANIBORON TM plating manufactured by Nippon Kanizen Co., Ltd. was used. This plating is a chemical nickel plating made by adding boron to a nickel-phosphorus plating, and the surface of the plating layer has a Vickers hardness of 750 HV. Conventional chemical nickel-phosphorus plating has a Vickers hardness of around 520 HV, which is small. FIG. 5 is a diagram showing the relation between maximum stresses acting in contact portions between the balls and the rolling groove of the ball balancer and rotational speeds of the disk. The higher the rotational speeds of the disk, the more the maximum stresses at the contact portions. Meanwhile, it has been confirmed that with a plating film having a thickness of 2 to 10 $\mu m$, one fifth of its hardness corresponded to a yield stress. The invention is directed to preventing wear on the rolling groove even at 50 times speed, i.e., rotational speed of 11,000 rpm. Hereupon, it is seen from FIG. 5 that the maximum stress in the contact portion at this time was nearly equal to a value obtained by stress converting hardness of the above-mentioned conventional chemical nickel-phosphorus plating, which would give rise to the danger of deformation of the rolling groove. With plating used in the invention (750 HV), however, a yield stress is sufficiently high and the rolling groove is free of deformation. In view of dispersion in hardness, coating is provided by a hard film having Vickers hardness of 600 HV or higher whereby an amount of wear of the rolling groove is reduced to eliminate generation of wear dust, thus enabling immobility of balls.

Results of evaluation of experimental operation of the unbalance correcting mechanism will be described below.
(Embodiment 1)

12 balls having been subjected to surface treatment with heptadecafluorodecyltrimethoxysilane and a turntable applied with 5 μm of KANIBORON TM plating (Ni—P—B) were used to assemble a CD-ROM unit mechanism with 1 μl of ester oil injected into a rolling groove.

Comparison Example 1

12 balls applied with no surface treatment and a turntable applied with 5 μm of KANIBORON TM plating were used to assemble a CD-ROM unit mechanism with 1 μl of ester oil injected into a rolling groove.

Comparison Example 2

12 balls applied with no surface treatment and a turntable applied with 5 μm of KANIBORON TM plating were used to assemble a CD-ROM unit mechanism with no ester oil injected into a rolling groove.

Comparison Example 3

12 balls applied with no surface treatment and a turntable applied with 5 μm of KANIBORON TM plating were used to assemble a CD-ROM unit mechanism with no ester oil injected into a rolling groove.

Figure 6:
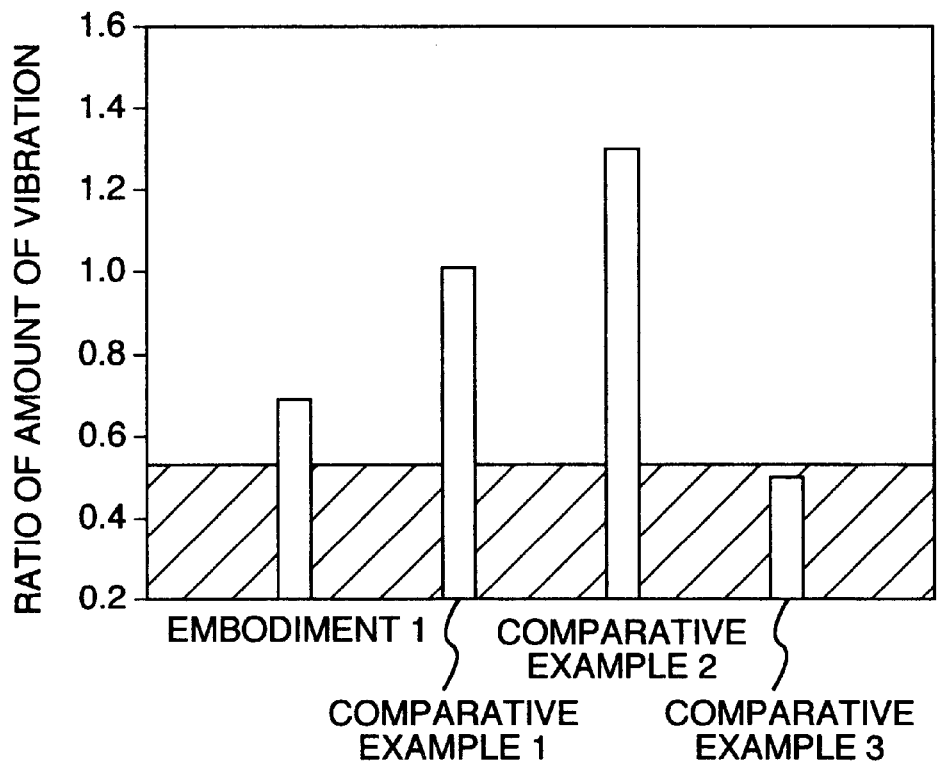
FIG. 6 is a graph showing experimental results of a disk drive according to a first embodiment of the invention and disk drives of comparative examples 1 to 3.

Experimental results of the embodiment 1 and comparative examples 1–3 are shown in FIG. 6. Experiments were made by mounting a disk of mass eccentricity and making a judgement through measurement of vibrations. The ordinate in FIG. 6 represents ratios of amounts of vibration in the respective experiments with an allowable amount of vibration being 1, in the disk unbalance correcting mechanism of the invention and in the disk drive using the correction mechanism. When the ratio of amount of vibration is larger than 1, the vibration is too large and difficult to make practical use of the mechanism. When the ratio of amount of vibration is smaller than 0.55 in a range of an oblique lines area in FIG. 6, the balls fail to settle but tend to stray and more than 5% of the number of tests is exceeded, which is not preferable.

An explanation will be given below to an unsettling phenomenon of correcting members (balls) that occurs during high speed rotation of a disk with reference to one embodiment of the invention. Here, a settling performance of balls refers to a motion, in which the balls cope with unbalance of a rotating system to move to an ideal unbalance correcting position.

Figure 7:
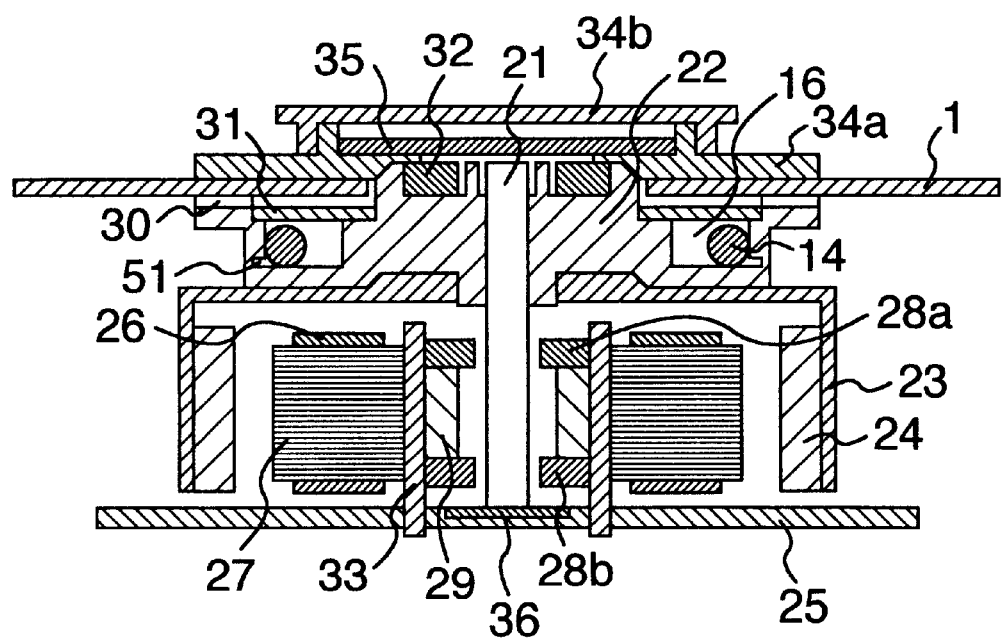
FIG. 7 is a cross sectional view showing a spindle motor unit in the invention.

FIG. 7 shows the construction of the unbalance correcting mechanism of the invention. FIG. 7 is a cross sectional view showing a spindle motor and its associated components in the disk drive of the invention.

In the disk drive of the embodiment, a disk 1 is mounted on a turntable 22. A disk damper comprises an attracting iron plate 35 installed inside an outer cylinder 34a and fixed by a retainer plate 34b. The turntable 22 is composed of a permanent magnet 32 provided on a boss portion of a shaft 21 side, an annular groove 16 on an outer peripheral side thereof to serve as an unbalance correcting mechanism, and a dust-proof cover 31 placed on a top of the groove to inhibit entry of dust from outside. In addition, received in the annular groove are a plurality of balls (spherical bodies) 14 serving as unbalance correcting members. Also, an elastic member 30 formed of rubber, plastic or rubber sheet is provided on that portion of the turntable on the outer peripheral side thereof, which contacts with the disk 1.

Figure 8A:
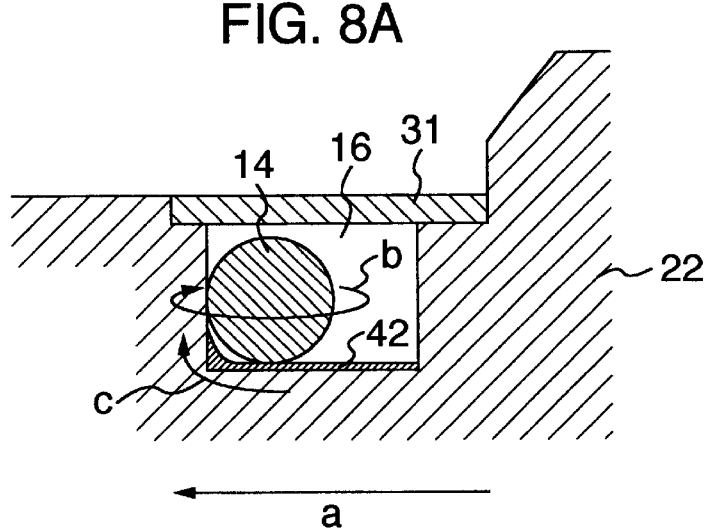
FIGS. 8A to 8C are views illustrating the structures of an unbalance correcting mechanism according to the invention, FIG. 8A being a view showing a structure, in which a recess is not provided in a lower side surface of a rolling groove, FIG. 8B being a view showing a structure, in which a recess is provided in the lower side surface of the rolling groove, and FIG. 8C being a view showing a structure, in which a recess is provided in the lower side surface of the rolling groove and a V-shaped groove is provided in that portion of the side surface, with which balls contact.
Figure 8B:
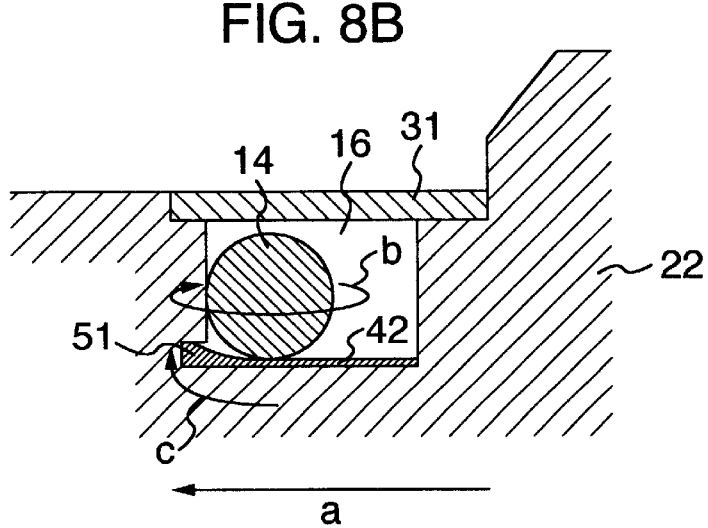
Figure 8C:
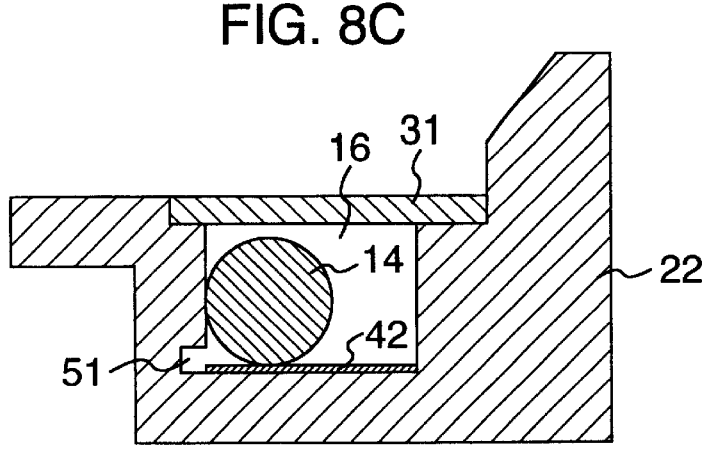

The turntable 22 is fitted onto the shaft 21, and mounts to an underside thereof an outer cylindrical portion 23 that constitutes a rotor of the spindle motor. Mounted to the outer cylindrical portion 23 is a permanent magnet 24. The spindle motor comprises radial bearings 28a, 28b for supporting the shaft 21, a spacer 29, which are mounted on a radial bearing housing 33 around a rotating axis, and a thrust bearing 36, the radial bearing housing 33 mounting a coil 27 and a motor stator 26 on an opposite side to the shaft 21. In addition, the bearing housing 33 and the thrust bearing 36 are secured to a stator board 25. FIGS. 8A to 8C are enlarged views showing the unbalance correcting mechanism.

FIG. 8A shows a cross section of the annular groove 16, which constitutes the unbalance correcting mechanism. When the balls 14 roll in the annular groove 16 to correct unbalance of the rotating system, the balls 14 roll contacting with the sidewall of the annular groove 16 (indicated by an arrow b in the figure). At this time, it is preferable that the ball 14 be put in sliding condition at a contact portion on a bottom surface of the annular groove 16 and in rolling condition on a sidewall surface of the annular groove 16 at all times. The preceding embodiment copes with this by optimumly selecting surfaces of the balls and of the annular groove and a lubricating oil used. However, it is difficult to maintain an ideal state over a long term with the progress of deterioration of the lubricating oil, and so the following construction is adopted to further prolong the ideal state.

FIG. 8A shows a configuration of a conventional groove. Owing to deterioration of a lubricating oil and so on, the lubricating oil (viscous material) 42 applied to the bottom surface of the annular groove 16 moves toward the outer periphery of the groove (indicated by an arrow c) due to a centrifugal force (acting in the direction of arrow a in the figure) upon high speed rotation of the disk. When the spindle motor is rotated for a long period of time, the lubricating oil 42 flows onto the sidewall of the annular groove 16 to cause the balls 14 to slide on the sidewall. As a result, an unsettling phenomenon of the balls 14 generates in the unbalance correcting operation during high-speed rotation.

FIG. 8B shows an embodiment of a structure of the annular groove 16 to solve the above problem. In the embodiment, an annular recess or groove 51 is formed on the sidewall of the annular groove 16 to be disposed between the bottom of the annular groove applied with the viscous material 42 and a point of contact on the sidewall, at which the balls 14 are contacted by the centrifugal force generated by the rotation of the spindle motor. This groove functions to prevent the lubricating oil 42 from flowing onto the sidewall of the annular groove 16 when acted upon by the centrifugal force described in FIG. 8A. Characters (a, b, c) in the figure are the same as those used in FIG. 8A.

The viscous material 42 applied to the bottom surface of the annular groove 16 moves toward the outer periphery of the annular groove 16 as the spindle motor rotates at high speed. Here, the viscous material 42 flows into the annular recess 51 formed in the annular groove 16, and the centrifugal force acts toward the outer periphery, so that the viscous material 42 can be completely prevented from flowing (toward the inner periphery) onto the sidewall of the annular groove 16 from the annular recess 51. Therefore, the balls 14 come into rolling contact with the annular groove 16 on the sidewall thereof and into sliding contact therewith on the bottom surface. Thus, the sliding resistance can be reduced only at the bottom surface by the viscous material 42 applied to the bottom surface. While the embodiment has been described, which is provided newly with the recess 51, a similar effect can be obtained by providing an annular projection between the bottom of the annular groove 16 and a portion on the sidewall, with which the ball contacts. With such construction, it is possible to ensure a stable settling performance of the balls at the time of correction of unbalance even when a disk rotates at high speed (a centrifugal force increases) attendant upon high-speed data transfer, thereby achieving reduction in vibrations and noise generated from the disk drive and improves reliability.

FIG. 8C shows a further embodiment of an annular groove. In FIG. 8C, a V-shaped groove is formed at a portion of the sidewall of the annular groove 16, with which the ball 14 contacts and the annular recess 51 shown in FIG. 8B is also provided. With such construction, there is eliminated any vertical sliding between the balls and the sidewall of the annular groove 16 even when vertical vibrations are applied on the spindle motor, and the viscous material 42 applied to the bottom surface of the annular groove 16 will not flow onto the sidewall. Further, the balls can completely perform correction of unbalance while in rolling contact by setting a location of the V-shaped groove in the sidewall such that the balls 14 are separate from the bottom of the annular groove 16 when pressed against the sidewall by the centrifugal force.

In FIGS. 8A to 8C, it has been proposed that the lubricating oil 42 acts only on the bottom of the annular groove 16 in the state of contact between the annular groove 16 and the balls 14. A similar effect can be obtained by using the above-mentioned surface treatment technique of balls to subject only the sidewall of the annular groove 16 to surface treatment. Further, the constitution shown in FIGS. 8A to 8C makes it possible to keep the balls in rolling contact with the sidewall over a long term even in the case where a conventional lubricating oil and conventional balls are used or surfaces of an annular groove is in a conventional state.

As described above, the disk drive of the invention can be shortened in running-in because contact between the balls and the rolling groove in the unbalance correcting mechanism is stable from the beginning of assembly, whereby it becomes possible to shorten production time and reduce cost.

Also, immobility of balls is eliminated because wear of balls or of a rolling groove caused by long term operation of a disk drive is reduced. Further, straying of balls is eliminated, in which forces for restraining balls to a rolling groove become too small to make the balls stationary relative to the rolling groove in an unbalance correcting position.

What is claimed is:

1. A disk drive having an unbalance correcting mechanism comprising an annular groove formed on a rotating member of a spindle motor, and a plurality of rollable correcting bodies provided in the annular groove, and wherein surface tension of surfaces of the rollable correcting bodies is 30 dyne/cm or less and surface treatment is applied on the surfaces of the rollable correcting bodies to provide the surfaces with a water contact angle of 80–150 degrees.

2. A disk drive having an unbalance correcting mechanism comprising an annular groove formed on a rotating member of a spindle motor, and a plurality of rollable correcting bodies provided in the annular groove, and wherein surfaces of the rollable correcting bodies are treated with a compound, which contains fluorine.

3. A disk drive having an unbalance correcting mechanism comprising an annular groove formed on a rotating member of a spindle motor, and a plurality of rollable correcting bodies provided in the annular groove, and wherein surfaces of the rollable correcting bodies are treated with polymer of fluoroalkylsilane or fluoroalkylsilane or with a layer of fluororesin.

4. The disk drive according to any one of claims 1 to 3, wherein a lubricating oil, of which a main component is ester oil, is injected into the annular groove.

5. The disk drive according to claim 4, wherein the annular groove is formed on a surface thereof with a hard film layer, which has a Vickers hardness of 600 or higher.

6. A disk drive according to claim 5, wherein the hard film layer is a plating layer containing nickel as its main component, phosphorus and boron.

7. A disk drive having an unbalance correcting mechanism comprising an annular groove formed on a rotating member of a spindle motor, and a plurality of rollable correcting bodies provided in the annular groove, the annular groove having a bottom surface, wherein a lubricating oil is applied to the bottom surface, and further comprising a recess or a projection provided between the bottom surface of the annular groove having the lubricating oil applied thereon and any point on a sidewall of the annular groove which is contacted by the rollable correcting bodies during rotation, wherein the rollable correcting bodies contact the bottom surface of the annular groove having the lubricating oil applied thereon during the rotation.

\* \* \* \* \*